United States Patent
Roth et al.

(10) Patent No.: US 6,899,747 B2
(45) Date of Patent: May 31, 2005

(54) SEPARATOR FOR A WET VACUUM DEVICE AND METHOD FOR SEPARATING DIRT AND DUST PARTICLES AS WELL AS WATER DROPLETS FROM AN AIR/GAS STREAM OF A WET VACUUM DEVICE

(75) Inventors: Paul Roth, Isny (DE); Helmut Grassinger, Argenbühl (DE); Anton Kreis, Tettnang (DE)

(73) Assignee: Proair GmbH Gerätebau, Argenbühl-Eglofs (DE)

( * ) Notice: Subject to any disclaimer, the term of this patent is extended or adjusted under 35 U.S.C. 154(b) by 88 days.

(21) Appl. No.: 10/248,883

(22) Filed: Feb. 27, 2003

(65) Prior Publication Data

US 2003/0159580 A1 Aug. 28, 2003

(30) Foreign Application Priority Data

Feb. 27, 2002 (DE) .......................................... 102 08 553

(51) Int. Cl.[7] .............................................. B01D 47/02
(52) U.S. Cl. ............................... 95/226; 96/333; 96/359
(58) Field of Search ..................... 95/226, 269; 96/335, 96/351, 306, 309, 310, 329, 330, 332, 356, 359, 333; 55/DIG. 3; 15/353

(56) References Cited

U.S. PATENT DOCUMENTS

| 5,096,475 A | * | 3/1992 | Kasper et al. ................. 96/333 |
| 5,902,386 A | * | 5/1999 | Gustafson et al. ............. 96/333 |
| 6,224,656 B1 | * | 5/2001 | Kawamoto ..................... 96/331 |
| 6,306,199 B1 | * | 10/2001 | Gustafson et al. ............. 95/226 |

* cited by examiner

Primary Examiner—Frank M. Lawrence
(74) Attorney, Agent, or Firm—Gudrun E. Huckett

(57) ABSTRACT

A separator for a wet vacuum device has a bottom and a sidewall connected to the bottom. The sidewall has stays defining slots between the stays. An air/gas stream, containing particles to be separated from the air/gas stream, enters the separator through the slots near the bottom, and the particles are separated from the air/gas stream by centrifugal force and are expelled from the separator at a spacing from the bottom through the slots. Between 3 and 45 slots are distributed about the circumference of the sidewall. The slots have a slot depth and a slot width, wherein the slot depth is substantially 0.2 up to 2.5 times as large as the slot width. The rotating separator is arranged above the liquid bath such that it agitates the surface of the liquid bath.

29 Claims, 5 Drawing Sheets

SEPARATOR FOR A WET VACUUM DEVICE AND METHOD FOR SEPARATING DIRT AND DUST PARTICLES AS WELL AS WATER DROPLETS FROM AN AIR/GAS STREAM OF A WET VACUUM DEVICE

BACKGROUND OF INVENTION

1. Field of the Invention

The invention relates to a separator for a wet vacuum device. The separator comprises a bottom and a side wall in which slots separated from one another by stays are provided. An air/gas stream, containing dirt/dust particles and/or water droplets, flows near the bottom through the slots into the separator. In the separator, the dirt/dust particles and the water droplets are separated by centrifugal action from the air/gas stream and are thrown or expelled outwardly through the slots at a spacing from the bottom.

The invention relates also to a method for separating dirt/dust particles and/or water droplets from an air/gas stream in connection with the above described separator, wherein the air/gas stream, containing dirt/dust particles and/or water droplets, is sucked in and guided through a liquid bath, in which a first separation of the dirt/dust particles occurs, and subsequently guided into the separator.

2. Description of the Related Art

Wet vacuum devices are known which have a rotatably driven separator. It has a cylindrical or conical mantle surface (peripheral surface) in which slots are distributed about the circumference. The separator is positioned above a liquid bath through which the air containing dirt/dust particles is guided. The dirt/dust particles are retained within the liquid. After having passed through the liquid bath, the air is sucked in by the separator and reaches the interior of the separator through the slots. Dirt/dust particles as well as very fine water droplets still contained within the air flow combine within the separator so that the dirt/dust particles become wet or moist. These particles are then expelled by centrifugal force out of the separator. The separator has 40 to 110 vertical slots distributed about its circumference. The slot depth is 2 to 3 times the width of the slots. The slots are designed to be so small that as few as few possible of the dirt/dust particles and/or liquid droplets will reach the separator. Because of the narrow configuration of the slots, the slots become plugged in their outlet area by the moist dirt/dust particles which are expelled from the separator so that the cleaning effect is impaired. At the same time, this configuration of the separator also reduces the splash guard effect for splash water. As a result of the narrow slots, the air velocity is increased when the air flow passes through the slots; this decreases the separator effect.

SUMMARY OF INVENTION

It is an object of the present invention to configure a separator of the aforementioned kind and a method of the aforementioned kind such that an optimal separation of the particles contained in the air/gas stream, such as dirt/dust particles and/or water droplets, is achieved.

In accordance with the present invention, this is achieved in regard to the separator in that approximately 3 up to approximately 45 slots are distributed about the circumference of the side wall, wherein the slot depth of the slots is approximately 0.2 to approximately 2.5 times as large as the slot width of the slots.

In accordance with the present invention this is achieved in regard to the method in that the separator is driven at such a rotational speed that at least the surface of the liquid bath is agitated such that retention in the liquid of the dirt/dust particles contained in the air/gas stream is improved.

The separator according to the invention is characterized in that it has only a minimal number of slots. The corresponding minimal number of stays which delimit these slots results in a minimal surface area so that only a minimal quantity of dirt/dust particles can deposit on the stays or on the separator. It is therefore possible to clean the separator at greater time intervals. As a result of the minimal number of slots, the slots are correspondingly wide so that the stays positioned between them can be cleaned easily. As a result of the wide slots, plugging of the slots by expelled dirt/dust particles is reliably prevented. Still, the separating effect of the separator according to the invention is optimal. As a result of the wide slots, the flow velocity, in particular of the incoming air/gas flow, is minimal so that, in comparison to the known separators, a very high residence time of the air/gas flow is obtained in the area of the stays that separate the slots. In this way, the centrifugal force can act for a long period of time on the dirt/dust particles so that a large number of dirt/dust particles is thrown back into the liquid bath and does not even reach the interior of the separator.

In the method according to the invention, the separator is driven at such a rotational speed that at least the surface of the liquid bath is agitated. This has the result that the separation of the dirt/dust particles in the liquid bath is significantly increased so that only a minimal amount of dirt/dust particles is sucked into the interior of the separator.

DETAILED DESCRIPTION

Figure 12:
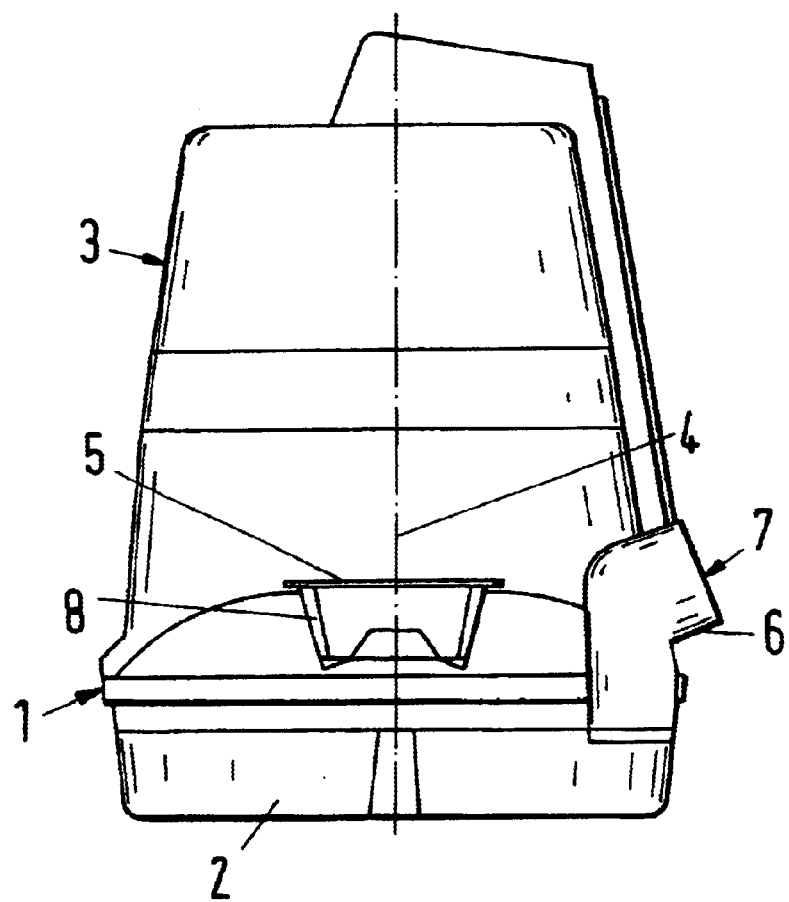
FIG. 12 is a schematic side view of a wet vacuum device provided with a separator according to the invention.

The wet vacuum device (FIG. 12) has a tub-shaped housing part 1 for receiving liquids, preferably water, as a liquid bath 2. A housing part 3 is placed onto the housing part 1 and receives a motor (not illustrated) having a vertical motor shaft 4. A separator 5 is fixedly attached to the lower end of the motor shaft. It is positioned at a spacing above the liquid bath 2. A mains connection line (electrical cable), not illustrated in the drawing, extends from the housing part 3. The housing part 3 is provided with outlet openings through which the air which has been cleaned in the wet vacuum device exits to the device, as is known in the art.

The housing part 1 is provided with a connecting socket 6 to which a suction hose (not illustrated) is attached. On the other end of the suction hose, a cleaning device such as a cleaning brush is provided with which dirt is removed from the floor, the carpet or the like. The dirty air flows in the direction of arrow 7 into the lower housing part 1. Within the housing part 1 guide elements (not illustrated) for guiding the taken-in dirty air can be provided which deflect the dirty air downwardly in the direction toward the liquid bath 2. However, it is also possible, as illustrated in an exemplary fashion in FIG. 3, to guide the connecting socket 6 within the housing part 1 in the downward direction to a location proximal to the surface of the liquid bath 2. In this way, it is also achieved that the dirty air exiting from the connecting socket 6 within the housing part 1 will inevitably reach the liquid bath 2.

The suction effect is generated by a fan which is arranged downstream of the separator 5; the separator 5 is rotated at a high rotational speed (high rpm). The separator 5 has slots 8 distributed about its circumference through which the taken-in air can enter the separator in a way to be described in the following. When the air containing dirt/dust particles passes through the liquid bath 2, the dirt/dust particles are retained while the air reaches the separator 5 and is then guided in a way to be described in the following out of the separator. Dirt/dust particles possibly still contained in the air after passing through the liquid bath 2 are entrained by the air and introduced into the separator 5. Also, finest liquid particles (water droplets) are usually sucked in through the slots 8 into the separator 5. Within the separator 5 mixing between the particles (fine dirt/dust particles and the fine water droplets) occurs which, as the result of the centrifugal force, are then forced through the slots 8 of the separator 5 outwardly to the exterior. In this way, the air is completely cleaned from the dirt/dust particles so that clean air will exit from the wet vacuum device.

Figure 1:
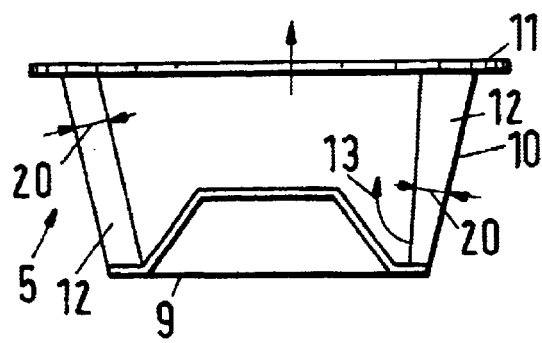
FIG. 1 is a schematic side view of the separator according to the invention for a wet vacuum device.
Figure 2:
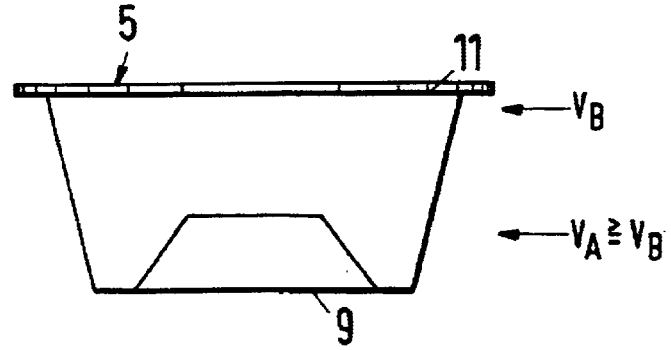
FIG. 2 shows in an illustration corresponding to FIG. 1 the intake conditions at the upper and lower ends of the separator.

As illustrated in FIG. 1, the separator 5 has the shape of a truncated cone. It comprises a planar bottom 9 and a sidewall having a conical mantle surface (peripheral surface) 10 connected to the bottom 9. The diameter of the conical mantle surface 10 increases continuously from the bottom 9 upwardly. The end of the conical mantle surface 10 opposite the bottom 9 adjoins a rim 11. The rim 11 has the shape of an annular disk (FIG. 9) which projects radially outwardly past the conical mantle surface 10.

Figure 9:
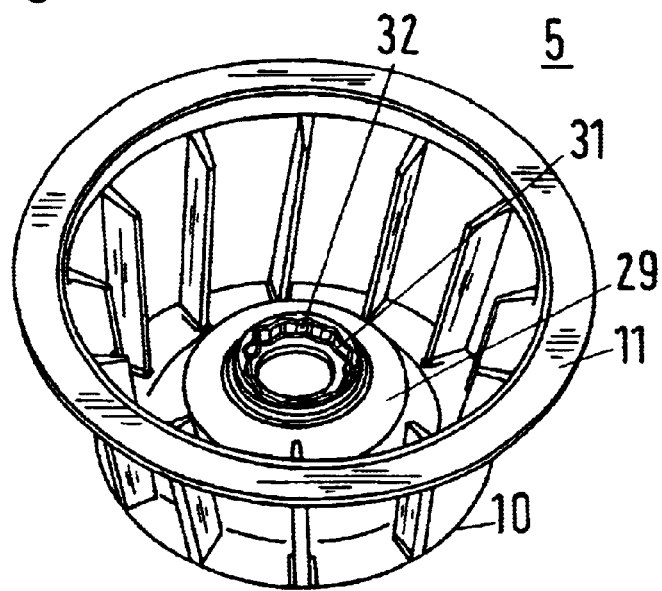
FIG. 9 is a perspective illustration of another embodiment of the separator according to the invention.
Figure 10:
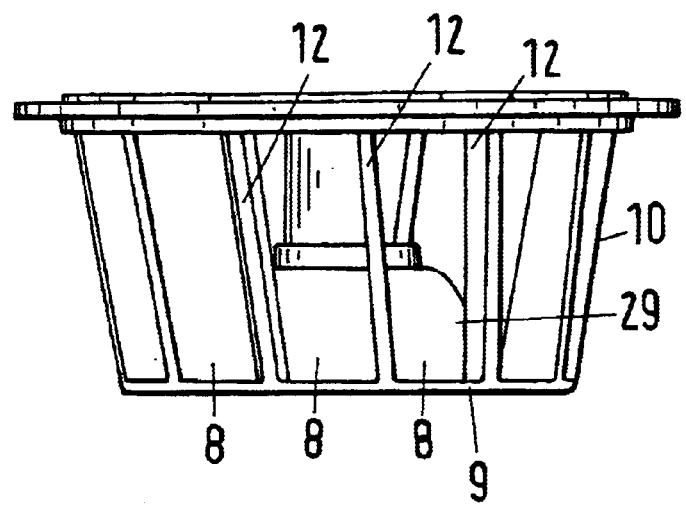
FIG. 10 shows the separator according to FIG. 9 in a side view.

As illustrated in FIGS. 9 and 10, the conical mantle surface 10 is provided with slots 8 which are advantageously uniformly distributed about the circumference of the conical mantle surface 10 and extend advantageously from the bottom 9 to the rim 11. The slots 8 are separated from one another by stays 12.

The separator 5 rotates at high rpm (revolutions per minute) within the range of approximately 5,000 rpm up to approximately 20,000 rpm. As illustrated schematically in FIG. 1, the taken-in air enters the interior of the separator 5 in the vicinity of the bottom through the slots 8. After passing through the slots 8, the air flows within the separator 5 axially upwardly (flow direction 13). Within the separator 5 mixing of possibly still present finest dirt/dust particles contained in the air with sucked-in finest water droplets occurs; after they have combined, they are then expelled by centrifugal force in the area of the slots 8 that is neighboring the rim 11.

Approximately three up to 45 slots are provided about the circumference of the separator 5. It was found that even with only three slots distributed about the circumference of the separator 5 an optimal separating effect can be achieved. The slots 8 in this case are very wide and together extend about an angle of circumference of approximately 300 to 330 degrees. As a result of the high rpm or rotary speed of the separator 5, an optimal cleaning of the taken-in air is ensured even with such a very small number of slots. Since the separator is provided with only very few slots in the range of 3 to 45, there is also only a correspondingly minimal surface area available on which the dirt/dust particles can deposit during the use of the vacuum device. For such a minimal number of slots there is even a self-cleaning effect which has the result that possibly present deposits on the stays 12 are removed again at least partially. In comparison to conventional separators, having a significantly higher number of slots and higher number of stays, only minimal deposits are found. The separator 5 can be easily cleaned because of the minimal number of slots and stays. The spacing between the stays 12 is sufficiently large so that possible present deposits on the stays 12 can be removed easily and without problems. The smaller the number of stays 12, the easier the cleaning action to be performed on the separator 5 by a housewife using the wet vacuum device.

A significant effect on the separating action of solid and liquid particles within the separator 5 is caused by the ratio of the depth 14 of the slots to the width 15 of the slots (FIG. 1l). The ratio of the slot depth 4 to the slot width 12 can be in the range of between approximately 0.2 and approximately 2.5. The ratio of slot depth 14 to slot width 15 is optimally selected to be approximately between 0.5 and 1.5. For example, the slot depth 14 can be only approximately half as large as the slot width 15. In this way, correspondingly wide slots 8 are formed through which the solid and liquid particles contained in the air can be conveyed optimally into the separator 5.

Figure 11:
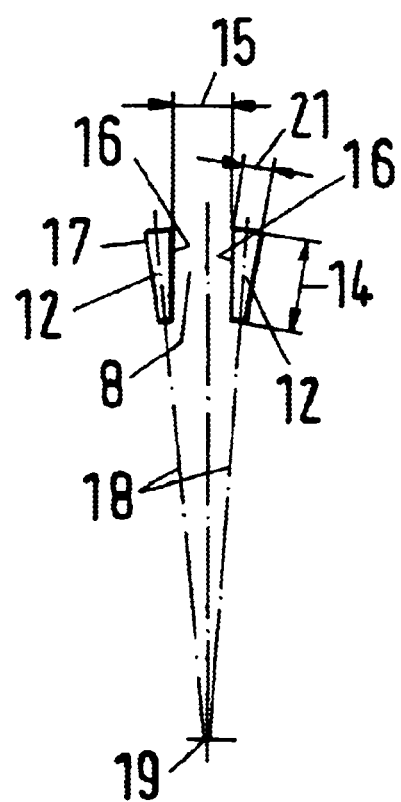
FIG. 11 is a sectional detail view of neighboring ribs of a separator according to the invention.

As illustrated in FIG. 11, the stays 12 taper with regard to their cross-section radially inwardly. Their sidewalls 16, 17 have a curved transition into one another at their radially inner end. The stays 12 are advantageously of identical length in the radial direction and have also the same cross-section. The stays 12 are arranged such that their longitudinal center plane 18 extends through the axis of curvature 19 of the separator 5. The sidewalls 16, 17 of the stays 12 are positioned at an acute angle to the corresponding longitudinal center plane 18. The facing sidewalls 16 and 17 of the stays 12 are positioned advantageously parallel to one another.

The stays 12 can have a constant depth 20 across their height, as illustrated in the left half of FIG. 1. Correspondingly, the slot depth 14 across their length is also constant.

The right half of FIG. 1 shows a configuration in which the depth 20 of the stays 12 increases from the bottom 9 in the direction toward the rim 11 of the separator 5. The slots 8 have thus in the area A indicated in FIG. 1 their minimal depth 14 and in the area B near the rim 11 the greatest depth 14. With the increasing stay depth 20 or slot depth 14, a targeted separation of the dirt/dust particles and water particles from the air/gas flow is achieved. These particles are forced radially outwardly by centrifugal force in the upper area of the slots 8 as a result of this stay configuration and are thus expelled from the separator 5. In connection with the provided ratio of slot depth 14 to slot width 15 of approximately 0.2 to approximately 2.5, the effectiveness of the centrifugal force acting on the dirt/dust particles and water droplets is improved so that these particles can exit again radially or tangentially through the slots 8 in the upper area of the separator 5, counter to the axially upwardly directed air/gas flow.

The separator 5 can also have a cylindrical mantle surface 10. In this case, the configuration of the stays 12, as illustrated in the right half of FIG. 1, with a radial depth increasing from the bottom 9 in the direction toward the rim 11 is beneficial. The facing radially inwardly positioned edges of the stays 12 are then positioned on an imaginary conical mantle surface while the outer mantle surface of the separator 5 is cylindrical. Because of the increasing stay depth, an optimal separation of the sucked-in dirt/dust particles and water droplets from the air/gas flow can also be achieved for a cylindrical separator 5, wherein the particles and droplets are then expelled by centrifugal force from the upper area of the slots 8.

The stay width 21 (FIG. 11) at the radially outer edge can be substantially smaller than the slot width 15 measured at the radially outer area of the slot 8. The stays 12 must only have such a width that a sufficient strength is provided.

In the following Table 1, different slot widths 15 as well as the corresponding minimum and maximum depths 14 are provided as examples. The provided examples are not to be understood as dimensional limitations but are only intended to illustrate how by means of the configuration of the slots 8 of the separator 5 the separating effect can be optimized with regard to the respective application.

Table 1

| width mm | 5 | 8 | 10 | 12 |
|---|---|---|---|---|
| minimum depth mm | 2.5 | 4 | 5 | 6 |
| maximum depth mm | 12.5 | 20 | 25 | 30 |

The configuration of the slots 8 allows an adjustment of the separator 5 such that at the smallest intake diameter in the area of the bottom 9 at least the same, preferably a larger, amount of air can enter the separator 5 through the slots 8 compared to that exiting at the greatest exit diameter in the area of the rim 11. The air intake quantity $V_A$ in the area of the bottom 9 is thus greater or identical to the exiting air quantity $V_B$ at the upper end of the slots 8 in the area of the rim 11. In order to achieve this, the slots can be configured to be parallel, stepped, or conically tapering. When the slot width 15 is constant across the length of the slots 8, the sidewalls 16, 17 of the stays 12 which delimit the slots 8 laterally extend parallel to one another. In this case, the air intake quantity $V_A$ at the lower end is approximately identical to the exiting air quantity $V_B$ at the upper end of the slots 8.

In the case of a stepped configuration, the slots 8 at the air intake area near the bottom 9 are narrower than in the air exit area near the rim 11. The incoming air with dirt/dust particles as well as water droplets contained therein can flow only slowly into the separator 5 because of the small intake cross-section so that in this way fewer dirt particles and water droplets will be sucked into the separator 5. At the same time, the residence time of the sucked-in air in the area of the stays 12 in comparison to conventional separators is significantly increased so that the centrifugal force can act for an extended period of time onto the sucked-in air containing dirt/dust particles and water droplets. The centrifugal force which is oriented radially outwardly ensures in the intake area that a greater number of dirt/dust particles can be thrown back into the liquid bath 2 and therefore will not reach the interior of the separator 5. This provides an improvement of the separating effect between the air/gas flow and these particles.

In order to achieve the stepped configuration of the slots 8, the sidewalls 16, 17 of the stays 12 facing one another are provided with corresponding steps so that in the intake area the slot width 15 is smaller than in the air exit area.

However, it is also possible to configure the slots 8 such that their width 15 widens continuously in the direction toward the rim 11. The corresponding sidewalls 16, 17 of the stays 12 accordingly extend divergingly in the direction toward the rim 11. Advantageously, the slot width 15 increases continuously in the direction of the separator rim 11.

Figure 3:
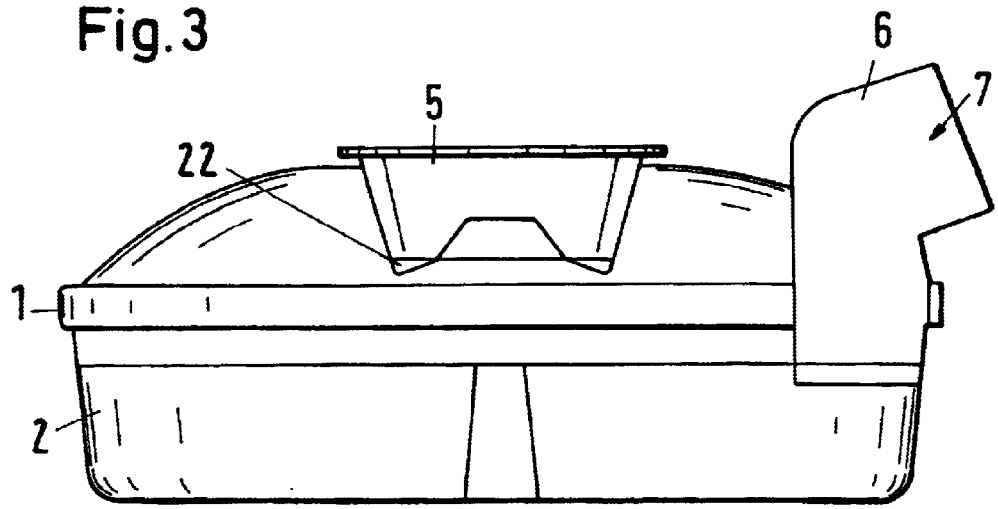
FIG. 3 shows in a schematic illustration a further embodiment of the separator according to the invention which is arranged in the area above a water bath of a wet vacuum device.
Figure 4:
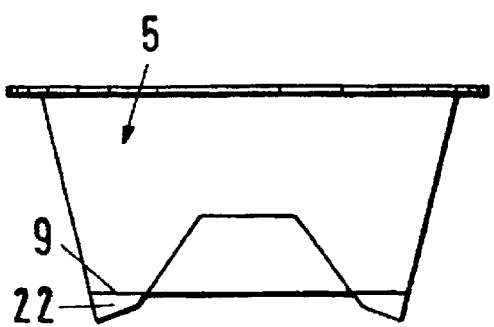
FIG. 4 is a schematic detail view of the separator according to FIG. 3.

In order to ensure that the greater portion of dirt/dust particles contained in the intake air is already retained in the liquid bath 2, the separator 5 is advantageously configured such that its rotation causes the liquid bath 2 to be swirled or agitated or caused to rotate. As result of this effect, the separation of the solid particles in the liquid bath is increased so that the proportion of remaining small dirt/dust particles in the air which is sucked into the separator 5 is only minimal. The separating effect in this way can be optimally increased and improved. In order to achieve this swirling effect, the separator 5 is provided with at least one swirl-generating element 22 (FIGS. 3 and 4). This swirl-generating or turbulence-generating element 22 is advantageously provided on the bottom 9, in particular, at the bottom side of the bottom 9.

In the embodiment according to FIGS. 3 and 4, the swirl-generating element 22 is a rib or a vane which projects from the bottom 9 downwardly and whose height advantageously increases continuously in the radially outward direction. Advantageously, about the circumference of the bottom 9 several such swirl-generating elements 22 are uniformly distributed. Their height increases from zero at the radially inner end continuously until they reach at the radially outer end their greatest height. These ribs/vanes 22 have the result that upon rotation of the separator 5 the liquid bath 2 is swirled (agitated) and/or rotated. In this way, the described excellent separation of the solid particles within the liquid bath 2 is achieved.

The ribs/vanes 22 can be positioned in radial planes of the separator 5. It is also possible that the ribs are positioned at an angle relative to the radial plane. Also, the ribs/vanes 22 can be curved about their radial length. As a result of this arrangement and/or configuration of the ribs/vanes 22, the turbulence (swirling) effect or rotation effect of the separator 5 can be adjusted in a constructively simple way to the desired application.

Figure 5:
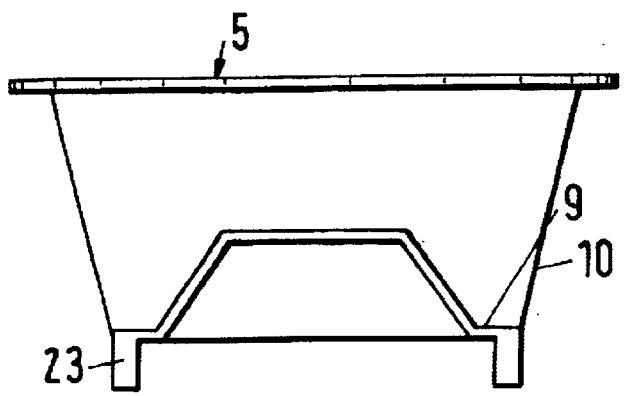
FIG. 5 is a schematic side view of another embodiment of the separator according to the invention.

FIG. 5 shows a separator 5 in which the swirl-generating element 23 is formed by a rim projecting past the bottom 9 in the downward direction and extending about the circumference of the bottom 9. This rim 23 can be positioned so as to form an extension of the mantle surface 10 of the separator 5. It is also possible to position the rim 23 radially slantedly inwardly or outwardly. The rim 23 forms a peripheral separating edge for the liquid. It has the effect that the liquid droplets which are possibly located at the side of the separator 5 facing the liquid bath 2 are knocked off without reaching the area of the slots 8.

Figure 6:
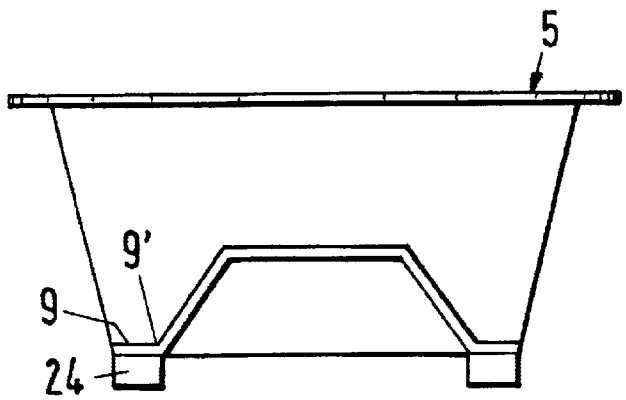
FIG. 6 is a schematic side view of yet another embodiment of the separator according to the invention.

In the separator 5 according to FIG. 6, the swirl-generating element 24 is formed by a rib connected to the bottom 9. In accordance with the embodiment of FIGS. 3 and 4, several ribs are advantageously distributed about the circumference of the bottom 9. The ribs have the same height about their length and extend up to the radial outer edge of the bottom 9. In contrast to the embodiment of FIGS. 3 and 4, the ribs 24 are placed onto (attached to) the bottom 9 of the separator 5 while the ribs/vanes of the separator according to FIGS. 3 and 4 are formed as a unitary or monolithic part of the separator. Since the ribs 24 are subsequently attached to the separator 5, separators which are already in use can be retrofitted with such swirl-generating elements 24. The ribs 24 extend like the ribs/vanes 22 from the radial rim 9' of the bottom 9 up to the radially outer edge.

Figure 7:
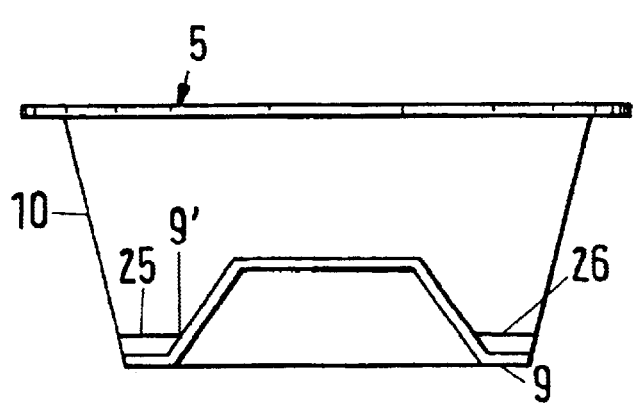
FIG. 7 is a schematic side view of yet another embodiment of the separator according to the invention.

In the separator 5 according to FIG. 7, the swirl-generating elements 25 are formed by a rib which is recessed within the bottom 9. Advantageously, several such swirl-generating elements 25 are provided about the circumference of the bottom 9. The bottom 9 is provided with corresponding recesses 26 for receiving the swirl-generating elements 25; the recesses 26 have a height matching advantageously the height of the swirl-generating elements 25. The rib-shaped swirl-generating elements 25 therefore do not project downwardly past the bottom 9. They extend, as in the embodiment according to FIG. 6, from the radially inner edge 9' of the bottom 9 to the mantle surface 10 of the separator 5. The swirl-generating elements 25 can be positioned in radial planes of the separator 5, but can also be positioned at an acute angle relative thereto. The rib-shaped swirl-generating elements 25 can be straight (linear) but also curved.

Figure 8:
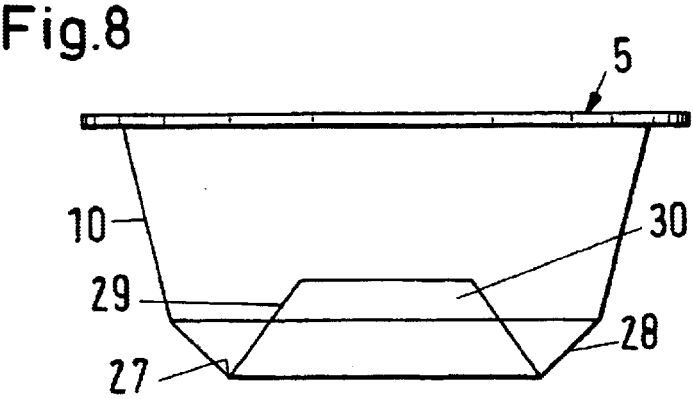
FIG. 8 is a schematic side view of yet another embodiment of the separator according to the invention.

In the separator 5 according to FIG. 8, the swirl-generating element 27 is formed by a peripheral edge of the separator 5 which, as in the embodiment of FIG. 5, forms a separating edge for the liquid. For forming this edge 27, the mantle surface 10 is provided with a slanted portion 28 in the lower area. The edge 27 is formed by the slanted portion 28 together with a conical sidewall 29 of a central recess 30 of the separator 5.

By means of the different swirl-generating elements 22 to 25, 27, the expulsion effect for the dirt/dust particles and water droplets taken in with the air/gas flow is improved in the area of the side of the separator 5 facing the liquid bath 2. Moreover, entry or backflow of liquid particles through the slots 8 is prevented. In the embodiment according to FIGS. 3 and 4, the height of the swirl-generating elements 22 in the area of the smallest diameter is preferably zero so that the intake suction effect in the area of the separator surface facing the liquid bath 2 is reduced.

All separators 5 have a central recess 30 at the bottom 9; this recess 30 is limited by the sidewall 29 which tapers conically in the direction toward the rim 11. The inwardly positioned bottom 31 of the recess 30 is provided with a form-fitting receptacle 32 (FIG. 9) into which a nut can be inserted so as to be secured against rotation.

The separation of the dirt/dust particles in the liquid bath 2 is significantly improved when the spacing of the separator 5 from the surface of liquid bath 2 is as small as possible. It should be approximately 5 mm up to approximately 35 mm, preferably approximately 10 mm to approximately 30 mm. In this way, at least the surface of the liquid bath 2 is turbulently agitated (swirled) and/or at least the upper part of the liquid bath 2 is rotated. The rotating separator 5 generates a corresponding drag which results in a rotation of the liquid bath 2. When the separator 5 is also provided with swirl-generating elements 22 to 25, 27, the primary separation of the solid particles in the liquid bath 2 is significantly increased.

In known wet vacuum devices the separator is arranged at a great spacing above the liquid bath so that only a minimal amount of liquid is sucked in. However, the wetting of the dirt/dust particles within the separator 5 is then unsatisfactory.

As a result of the described configuration the separators 5 according to FIGS. 3 through 10 can be arranged very close to the surface of the liquid bath 2 without too much liquid reaching the separator 5.

The described separators 5 have a double function with which the primary and secondary separations of the particles sucked in with the air can be affected. The primary separation of the dust/dirt particles takes place in the liquid bath 2. The separating effect in the liquid bath 2 is affected in a targeted way by adjusting the spacing of the separator 5 to the surface of the liquid bath 2 and/or by the swirl-generating elements 22 to 25, 27. The smaller the spacing of the separator 5 to the surface of the liquid bath 2, the greater the turbulence effect and/or rotation of the liquid and the more effective the primary separation of the dust/dirt particles in the liquid bath 2. With the swirl-generating elements 22 to 25, 27, the turbulence (swirling) and/or rotation of the liquid in the liquid bath 2 can be affected additionally in targeted way. It has been explained in an exemplary fashion with the aid of FIGS. 3 through 8 how the configuration, distribution, and position of the swirl-generating elements can affect the turbulence and rotation of the liquid. Accordingly, by fine-tuning the spacing of the separator 5 from the surface of the liquid bath 2 in combination with the swirl-generating elements 22 to 25, 27, the primary separation of the dirt/dust particles in the liquid bath 2 can be adjusted in an optimal fashion.

The second function of the separator 5 resides in that the particles not retained in the liquid bath 2 and/or the liquid droplets can be removed in the separator 5 from the air/gas flow. This secondary separation, as explained in detail with the aid of the illustrated embodiments, can be adjusted optimally to the respective application by varying and tuning the stay height, stay depth, slot height, slot depth, and/or length of the stays 12 and/or cross-section of the slots 8.

While specific embodiments of the invention have been shown and described in detail to illustrate the inventive principles, it will be understood that the invention may be embodied otherwise without departing from such principles.

What is claimed is:

1. A separator for a wet vacuum device, the separator comprising:

a bottom and a sidewall connected to the bottom;

the sidewall comprised of stays defining slots between the stays, wherein an air/gas stream, containing particles to be separated from the air/gas stream, enters the separator through the slots near the bottom and wherein the particles are separated from the air/gas stream by centrifugal force and are expelled from the separator at a spacing from the bottom through the slots;

wherein 3 to 45 of the slots are distributed about a circumference of the sidewall; and wherein the slots have a slot depth and a slot width, wherein the slot depth is substantially 0.2 up to 2.5 times as large as the slot width;

wherein the slots have an air intake area near the bottom provided with a first cross-section and have an air exit area, located at a spacing from the bottom, provided with a second cross-section, wherein the first cross-section is smaller than the second cross-section.

2. The separator according to claim 1, wherein the slots, viewed in a side view, extend in an axial direction of the separator.

3. The separator (5) according to claim 1, wherein the slots, viewed in a side view, extend slantedly relative to an axial direction of the separator.

4. The separator (5) according to claim 1, wherein the slots have a center plane positioned in a radial plane of the separator.

5. The separator (5) according to claim 4, wherein the center plane of each one of the slots is curved.

6. The separator (5) according to claim 1, wherein a ratio of the slot depth to the slot width is substantially between 0.5 and 1.5.

7. The separator according to claim 1, wherein the slots have a third cross-section located between the first and second cross-sections, wherein the third cross-section increases from the first cross-section to the second cross-section.

8. The separator according to claim 7, wherein the third cross-section increases continuously.

9. The separator according to claim 1, wherein the slots have a step between the first and second cross-sections.

10. The separator according to claim 1, further comprising at least one swirl-generating element.

11. A separator for a wet vacuum device, the separator comprising:
    a bottom and a sidewall connected to the bottom;
    the sidewall comprised of stays defining slots between the stays, wherein an air/gas stream, containing particles to be separated from the air/gas stream, enters the separator through the slots near the bottom and wherein the particles are separated from the air/gas stream by centrifugal force and are expelled from the separator at a spacing from the bottom through the slots;
    wherein 3 to 45 of the slots are distributed about a circumference of the sidewall; and
    wherein the slots have a slot depth and a slot width, wherein the slot depth is substantially 0.2 up to 2.5 times as large as the slot width;
    at least one swirl-generating element;
    wherein the at least one swirl-generating element is provided on the bottom of the separator.

12. A separator for a wet vacuum device, the separator comprising:
    a bottom and a sidewall connected to the bottom;
    the sidewall comprised of stays defining slots between the stays, wherein an air/gas stream, containing particles to be separated from the air/gas stream, enters the separator through the slots near the bottom and wherein the particles are separated from the air/gas stream by centrifugal force and are expelled from the separator at a spacing from the bottom through the slots;
    wherein 3 to 45 of the slots are distributed about a circumference of the sidewall; and
    wherein the slots have a slot depth and a slot width, wherein the slot depth is substantially 0.2 up to 2.5 times as large as the slot width;
    at least one swirl-generating element;
    wherein the at least one swirl-generating element projects downwardly past a bottom side of the bottom.

13. The separator according to claim 11, wherein the at least one swirl-generating element is recessed within the bottom.

14. The separator according to claim 11, wherein the at least one swirl-generating element is a rib-shaped or vane-shaped.

15. The separator according to claim 11, wherein the at least one swirl-generating element extends radially.

16. A separator for a wet vacuum device, the separator comprising:
    a bottom and a sidewall connected to the bottom;
    the sidewall comprised of stays defining slots between the stays, wherein an air/gas stream, containing particles to be separated from the air/gas stream, enters the separator through the slots near the bottom and wherein the particles are separated from the air/gas stream by centrifugal force and are expelled from the separator at a spacing from the bottom through the slots;
    wherein 3 to 45 of the slots are distributed about a circumference of the sidewall; and
    wherein the slots have a slot depth and a slot width, wherein the slot depth is substantially 0.2 up to 2.5 times as large as the slot width;
    at least one swirl-generating element;
    wherein the at least one swirl-generating element has a constant height across a length of the at least one swirl-generating element.

17. The separator according to claim 11, wherein the at least one swirl-generating element has a height changing across a length of the at least one swirl-generating element.

18. A separator for a wet vacuum device, the separator comprising:
    a bottom and a sidewall connected to the bottom;
    the sidewall comprised of stays defining slots between the stays, wherein an air/gas stream, containing particles to be separated from the air/gas stream, enters the separator through the slots near the bottom and wherein the particles are separated from the air/gas stream by centrifugal force and are expelled from the separator at a spacing from the bottom through the slots;
    wherein 3 to 45 of the slots are distributed about a circumference of the sidewall; and
    wherein the slots have a slot depth and a slot width, wherein the slot depth is substantially 0.2 up to 2.5 times as large as the slot width;
    at least one swirl-generating element having a height that changes across a length of the at least one swirl-generating element;
    wherein the height increases in a radially outward direction of the separator.

19. The separator according to claim 18, wherein the height increases continuously.

20. A separator for a wet vacuum device, the separator comprising:
    a bottom and a sidewall connected to the bottom;
    the sidewall comprised of stays defining slots between the stays, wherein an air/gas stream, containing particles to be separated from the air/gas stream, enters the separator through the slots near the bottom and wherein the particles are separated from the air/gas stream centrifugal force and are expelled from the separator at a spacing from the bottom through the slots;
    wherein 3 to 45 of the slots are distributed about a circumference of the sidewall; and
    wherein the slots have a slot death and a slot width, wherein the slot depth is substantially 0.2 up to 2.5 times as large as the slot width;
    at least one swirl-generating element having a height that changes across a length of the at least one swirl-generating element;
    wherein the at least one swirl-generating element has a height of zero at a radially inner end of the at least one swirl-generating element.

21. A separator for a wet vacuum device, the separator comprising:

a bottom and a sidewall connected to the bottom;

the sidewall comprised of stays defining slots between the stays, wherein an air/gas stream, containing particles to be separated from the air/gas stream, enters the separator through the slots near the bottom and wherein the particles are separated from the air/gas stream by centrifugal force and are expelled from the separator at a spacing from the bottom through the slots;

wherein 3 to 45 of the slots are distributed about a circumference of the sidewall; and wherein the slots have a slot depth and a slot width, wherein the slot death is substantially 0.2 up to 2.5 times as large as the slot width;

at least one swirl-generating element;

wherein the at least one swirl-generating element is a rim projecting past the bottom in a downward direction and extending circumferentially about the bottom.

22. A separator for a wet vacuum device, the separator comprising:

a bottom and a sidewall connected to the bottom;

the sidewall comprised of stays defining slots between the stays, wherein an air/gas stream, containing particles to be separated from the air/gas stream, enters the separator through the slots near the bottom and wherein the particles are separated from the air/gas stream by centrifugal force and are expelled from the separator at a spacing from the bottom through the slots;

wherein 3 to 45 of the slots are distributed about a circumference of the sidewall; and wherein the slots have a slot depth and a slot width, wherein the slot depth is substantially 0.2 up to 2.5 times as large as the slot width;

at least one swirl-generating element;

wherein the at least one swirl-generating element is a peripheral edge of the separator.

23. A method for separating dirt/dust particles from an air/gas stream of a wet vacuum device, comprising a separator having a bottom and a sidewall connected to the bottom; the sidewall comprised of stays defining slots between the stays, wherein an air/gas stream, containing particles to be separated from the air/gas stream, enters the separator through the slots near the bottom and wherein the particles are separated from the air/gas stream by centrifugal force and are expelled from the separator at a spacing from the bottom through the slots; wherein 3 to 45 of the slots are distributed about a circumference of the sidewall; and wherein the slots have a slot depth and a slot width, wherein the slot depth is substantially 0.2 up to 2.5 times as large as the slot width; the method comprising the steps of:

sucking in an air/gas stream containing dirt/dust particles and guiding the air/gas stream through a liquid bath and from the liquid bath into the separator;

rotating the separator at a rotational speed causing a surface of the liquid bath to be agitated such that a greater amount of the dirt/dust particles is retained in the liquid bath compared to the surface of the liquid bath not being agitated.

24. The method according to claim 23, wherein the surface of the liquid bath is swirled.

25. The method according to claim 23, wherein at least an upper part of the liquid bath is rotated.

26. The method according to claim to 23, wherein the air/gas stream is sucked into the separator at a speed smaller than a speed at which the dirt/dust particles and optionally water droplets are expelled from the separator.

27. A method for separating dirt/dust particles from an air/gas stream of a wet vacuum device, comprising a separator having a bottom and a sidewall connected to the bottom; the sidewall comprised of stays defining slots between the stays, wherein an air/gas stream, containing particles to be separated from the air/gas stream, enters the separator through the slots near the bottom and wherein the particles are separated from the air/gas stream by centrifugal force and are expelled from the separator at a spacing from the bottom through the slots; wherein 3 to 45 of the slots are distributed about a circumference of the sidewall; and wherein the slots have a slot depth and a slot width, wherein the slot depth is substantially 0.2 up to 2.5 times as large as the slot width; the method comprising the steps of:

sucking in an air/gas stream containing dirt/dust particles and guiding the air/gas stream through a liquid bath and from the liquid bath into a separator;

positioning the separator at such a spacing from the surface of the liquid bath that a surface of the liquid bath is agitated such that a greater amount of the dirt/dust particles is retained in the liquid bath compared to the surface of the liquid bath not being agitated.

28. The method according to claim 27, wherein the spacing is substantially 5 mm up to 35 mm above the liquid bath.

29. The method according to claim to 27, wherein the air/gas stream is sucked into the separator at a speed smaller than a speed at which the dirt/dust particles and optionally water droplets are expelled from the separator.

* * * * *